United States Patent [19]
Krolopp et al.

[11] Patent Number: 4,905,301
[45] Date of Patent: Feb. 27, 1990

[54] SELECTIVE SYSTEM SCAN FOR MULTIZONE RADIOTELEPHONE SUBSCRIBER UNITS

[75] Inventors: Robert K. Krolopp, Hoffman Estates; Thomas J. Auchter, Barrington; Jeffery L. Mullins, Palatine, all of Ill.

[73] Assignee: Motorola, Inc., Schaumburg, Ill.

[21] Appl. No.: 225,337

[22] Filed: Jul. 28, 1988

[51] Int. Cl.[4] .............................................. H04Q 7/00
[52] U.S. Cl. ....................................... 455/34; 455/33; 455/166
[58] Field of Search ...................... 455/33, 34, 164, 54, 455/56, 161, 166, 168, 179; 379/59, 60, 63

[56] References Cited

U.S. PATENT DOCUMENTS

4,618,998 10/1986 Kanamura ............................ 455/34
4,669,107  5/1987 Eriksson-Lennartsson .......... 455/33

FOREIGN PATENT DOCUMENTS

0052933  3/1984 Japan .................................... 455/34

OTHER PUBLICATIONS

Electronic Industries Association: "EIA Interim Standard/Cellular System/Mobile Station-Land Station Compatibility Specification", IS-3-D, Mar. 1987.
Ericsson Radio Systems: "Suggested Improved Logic to the IS-3-D Specification", May 20, 1988.
Ericsson: "Proposed Changes/Amendments to the TACS-Specification" Document No. BT/Su 71318, 9/23/87.
M. Karim: "A Controller for the Mobile Logic Unit in the BTL High Capacity Mobile Telecommunications System", 26th Annual Conference of the IEEE Vehicular Technology Group, Mar. 1976, pp. 72–74.
Motorola, Inc.: "Mini-T*A*C 6800XL/Cellular Mobile Telephone", User's Manual 68P81117E80-0, 8/14/87, pp. 38–45.

Primary Examiner—Benedict V. Safourek
Assistant Examiner—Curtis Kuntz
Attorney, Agent, or Firm—Raymond A. Jenski; Rolland R. Hackbart

[57] ABSTRACT

A radiotelephone subscriber unit which overcomes the problem of attempting to access an undesired radiotelephone system is disclosed. A comparison between the system identification transmitted on a control channel of a desired radiotelephone system and the system identification transmitted on an access channel is made during the access process of the subscriber unit. Access is permitted if the control channel system identification and the access channel system identification match.

14 Claims, 5 Drawing Sheets

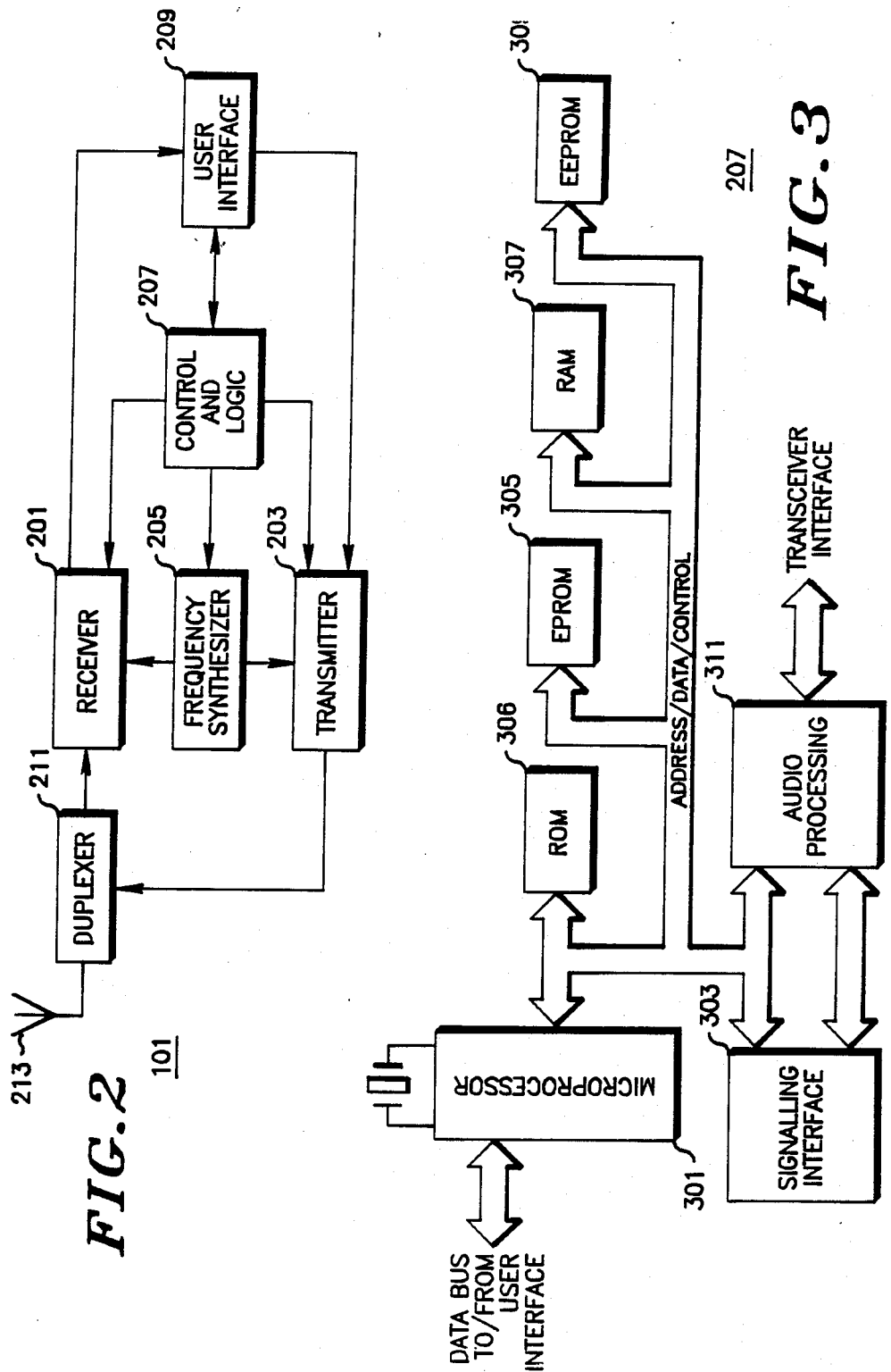

103, 105, 107, 109

SELECTIVE SYSTEM SCAN FOR MULTIZONE RADIOTELEPHONE SUBSCRIBER UNITS

BACKGROUND OF THE INVENTION

This invention relates generally to a radiotelephone subscriber transceiver unit which may operate into more than one fixed system and more particularly to a mobile or portable radiotelephone transceiver unit having the capability of communicating messages between itself and a fixed site on a selected one of a number of radio channels. Since the transceiver may access more than one system sharing the same or adjacent radio channels, the present invention provides the apparatus and method for preventing unwanted operation in an undesired system.

One common multizone radiotelephone system is that known as a cellular radiotelephone system. A cellular radiotelephone system provides radiotelephone coverage over a relatively large geographic area by subdividing that area into small radio zones called cells. Each cell is provided a plurality of duplex radio channels (voice channels) over which radiotelephone messages may be carried. To control the operation of the subscriber units and to assign voice channels, each cell has a duplex radio channel dedicated to transmit and receive control information (called a aging channel). Further, to enable a subscriber to gain access to the system (and place a telephone call), a duplex radio channel is dedicated in each cell to allow a subscriber access to the system (called an access channel). Further definition of cellular radiotelephone systems may be found in EIA Interim Standard IS-3-D (March, 1987); "Cellular System, Mobile Station-Land Station Compatibility Specification", Electronic Industries Association.

In operation, a subscriber station first scans a stored list of control channels which are assigned one per cell and used by the cellular radiotelephone system to convey digital control information from the fixed equipment to subscriber stations and to convey digital control information from a subscriber station to the fixed equipment. (The control channel in a cell may also be used as a paging channel and as an access channel but in densely populated systems, the control channel is a separate radio channel). A multiple bit system identification (SID) is transmitted as part of the digital information and digital overhead from the fixed site on the control channel. The subscriber unit selects the control channel having the best signal strength, ceases scanning the list of control channels, and stores the SID in its memory. The subscriber unit then awaits an indication from the fixed site that it is being called or awaits an activation by the subscriber unit user to attempt a telephone call. The list of control channels is rescanned periodically (for example, every five minutes) or upon loss of signal or upon command from the fixed site.

Generally, cellular systems operated by different entities coordinate their control, paging, and access channel frequencies so that interference between independent systems in minimized. In fact, geographically adjacent systems utilizing the same band of radio frequencies may coordinate the independent system operation such that calls may be made in either system by a subscriber unit which is registered initially in only one system. Nevertheless, overlapping of the geographic radio coverage area of one cell of one system into the radio coverage area of another cell in the adjacent system can occur, thus enabling a subscriber unit to access the adjacent system when the user of the subscriber unit wishes only to access his "home" system. A subscriber unit attempting access into one system will leave a control channel to a certain access channel in the cell. For radio propagation or other reasons, the subscriber unit may receive an adjacent channel or co-channel radio frequency access channel from another system and be unable to complete its access.

A previous solution to a similar problem used the fact that two competing cellular systems for the same geographic area (system "A" offered by non-wireline service suppliers and system "B" offered by conventional landline telephone companies) use different radio frequency channels. The subscriber unit can be programmed to scan only those control channels available to either system A or system B. (See Motorola "Mini T*A*C 6800XL Cellular Mobile Telephone User's Manual", 68P81117E80-O, Aug. 14, 1987, pp. 40-44).

Further, as indicated on page 42 of the above User's Manual 68P81117E80-O, a user may enter specific SID numbers to limit operation to only certain cellular systems corresponding to the entered SIDs. Again, this solution prevents a subscriber unit from stopping on a control channel transmitting any but one of the entered SIDs. The problem of the subscriber unit inadvertently attempting access on an access channel which is not part of the desired cellular system remains unsolved.

SUMMARY OF THE INVENTION

It is, therefore, one object of the present invention to prevent a subscriber unit from initiating access to one radiotelephone system and attempting to complete the access on another radiotelephone system.

It is another object of the present invention to use the system identification (SID) of the radiotelephone system to assure access into the initially selected radiotelephone system.

Accordingly, these and other objects are realized in the present invention which encompasses the apparatus and process by which a radiotelephone subscriber unit accesses a desired radiotelephone system. Each radiotelephone system has a plurality of radio coverage areas and has at least one control channel for each coverage area. Each control channel transmits a system identification which is unique to its associated radiotelephone system. The subscriber unit, which can operate in more than one radiotelephone system, selects a control channel, detects the transmitted control channel system identification, and stores the control channel system identification. The subscriber unit may then select one of a plurality of access channels and detecting an overhead data message on the selected access channel. The subscriber unit reads the access channel system identification from said detected overhead data message and compares the access channel system identification with the control channel system identification. If the comparison of the access channel system identification and the control channel system identification yields a substantial match, the subscriber unit may then seize a channel.

BRIEF DESCRIPTION OF THE DRAWINGS

FIG. 2 is a block diagram of the a mobile or portable radiotelephone unit which may employ the present invention.

FIG. 3 is a block diagram of the logic unit portion of the radiotelephone unit of FIG. 2 which may employ the present invention.

DESCRIPTION OF THE PREFERRED EMBODIMENT

Figure 1:
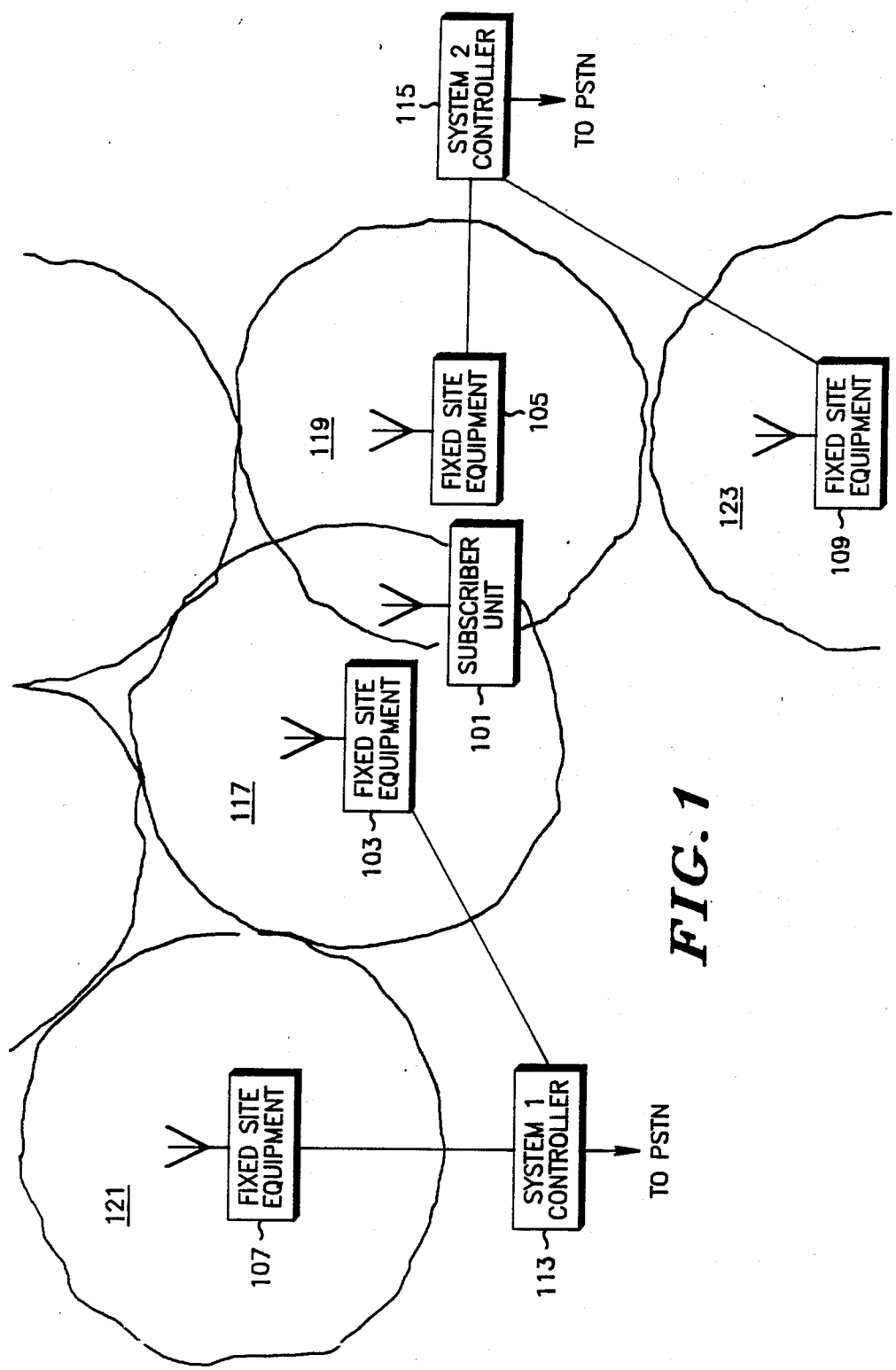
FIG. 1 is a block diagram of the basic elements of two cellular radiotelephone systems which have an overlap of cell coverage area and which may employ the present invention. Only two complete cells of each system

A radio system employing the present invention may be one such as that shown in FIG. 1. Two cellular radiotelephone systems are shown, each providing duplex radio telephone communications between the public switched telephone network (PSTN) and one or more subscriber units. A subscriber unit, such as unit 101, may communicate via radio to one of the fixed sites (103, 105, 107, or 109), which in turn couples two-way communication through a respective system controller 113 and 115. Each system controller can perform the operations of call placement, control, and interconnection with the public switched telephone network for its cellular radiotelephone system. As is well known, cellular systems are divided into many discrete radio coverage areas (cells) to provide radio coverage over a wide geographic area. Such cells are diagrammatically shown in FIG. 1 as areas 117, 119, 121, and 123. It is, of course, expected that each cellular radiotelephone system would comprise many more cells over a substantial geographic area. Cellular communications systems are further described in U.S. Pat. Nos. 3,663,762 and 3,906,166; also in an experimental cellular radiotelephone system filed with the Federal Communications Commission by Motorola, Inc. and American Radio-Telephone Service, Inc., in February 1977; in a system description entitled "Motorola DYNATAC Cellular Radiotelephone Systems", published by Motorola, Inc., Schaumburg, Ill. in 1982 and "The Cellular Concept" by MacDonald, The Bell System Technical Journal, January, 1979, Vol. 58 No. 1, pages 15–41.

These subscriber unit 101 may freely roam throughout the geographic area and typically may obtain service from either cellular radiotelephone system 1 or from cellular radiotelehpone system 2 depending upon the arrangements made between the user of the subscriber unit and each of the cellular systems. As shown in FIG. 1, subscriber unit 101 has traveled to a geographic area in which radio coverage from a cell 117 of cellular radiotelephone system 1 and from a cell 119 of cellular radiotelephone system 2 overlap. Under normal conditions, the subscriber unit 101 will obtain service from the cellular radiotelephone system to which the subscriber unit transceiver has tuned to its control channel, for example, system 1. Under the conditions described previously, however, the subscriber unit 101 may attempt a call in radiotelephone system but appear in the paging and access channel of cellular radiotelephone system 2. The present invention aids in avoiding this problem.

A subscriber unit which may advantageously employ the present invention in solving the problem is shown in the block diagram of FIG. 2. One such subscriber unit may be a commercially available mobile radiotelephone transceiver such as a Model No. F19ZEA8439BA manufactured by Motorola Inc. Such a radio transceiver consists of a receiver portion 201, a transmitter portion 203, and a frequency synthesizer portion 205, a logic portion 207, and audio transducers and user controls 209. A duplexer 211 couples an antenna 213 to the receiver portion 201 and couples a transmitter 203 to the antenna 213 in such a manner that receiver signals and transmit signals may be received and transmitted essentially without interference to each other. A subscriber unit which may also advantageously employ the present invention may be a portable radiotelephone of the type described in U.S. Pat. Nos. 6,624; 3,962,553; and 3,906,166.

The present invention resides primarily in the logic portion 207. A block diagram of the logic portion 207 employing the present invention is shown in more detail in FIG. 3. In the preferred embodiment, the logic portion 207 is a microcomputer which consists primarily of a call processor microprocessor 301 (which may be a commercially available microprocessor such as an MC6811 available from Motorola, Inc. or equivalent), a signaling interface circuit 303, (which may be a custom integrated circuit providing address decoding, data decoding, and tone generation) and microprocessor memory. The microprocessor memory of the preferred embodiment includes conventional 64K by 8 EPROM 305 containing a unique executive program, a ROM 306, conventional RAM 307, and EEPROM 309. An audio processing interface 311 provides interface between the microcomputer bus and other radio transceiver functions. Interface between the microcomputer and the user controls/audio transducers portion 209 is accomplished, in the preferred embodiment, via a three wire computer bus such as that described in U.S. Pat. No. 4,369,516.

Figure 4:
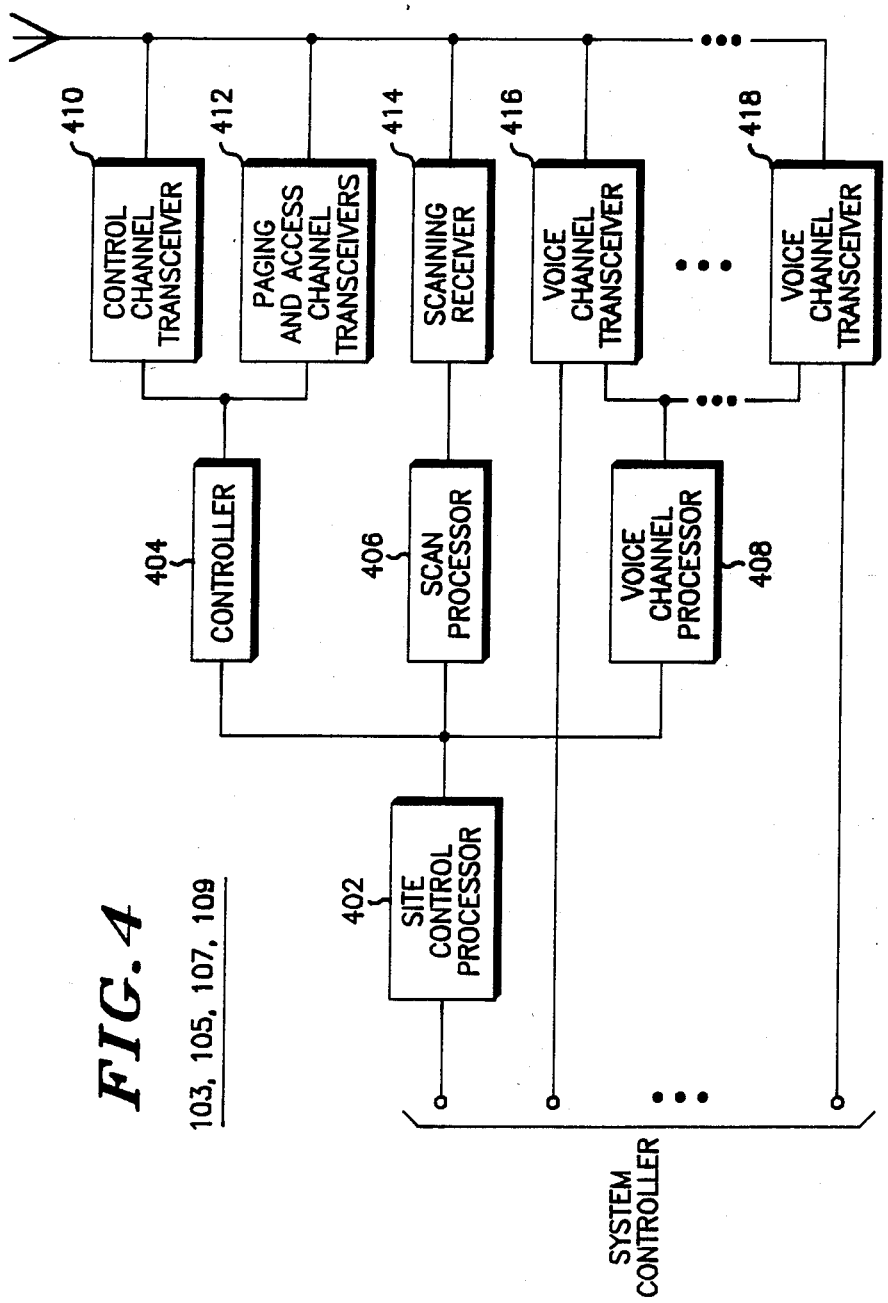
FIG. 4 is a block diagram of a typical fixed site equipment which may be employed in a cellular radiotelephone system.

Conventional equipment which may comprise fixed site equipment 103, 105, 107, and 109 is shown in the block diagram of FIG. 4. This equipment provides two-way subscriber signaling, voice communications, and cell fixed site control and performance monitoring. A site control processor 402 controls all aspects of the fixed site equipment operation and contains memory storage buffers for communication with the peripheral controllers and processors 404, 406, and 408. Site control processor 402 also contains serial interface ports for communicating with other site control processors and with the system controlled. A controller, 404, sends paging and overhead messages to a subscriber unit via the control channel transceiver 410 and the paging and access channel transceivers 412. The scan processor 406 measures the signal strength of every active subscriber unit on each receiving antenna and provides information to the site control processor to aid in the handoff process. The voice control processor 408 controls voice channel transceivers represented by voice channel transceiver 416 and voice channel transceiver 418. Further description of a similar cellular radiotelephone land station which may be utilized in the preferred embodiment may be found in U.S. Pat. No. 4,694,484.

The system controller 113 and 115 may be similar to the terminals described in U.S. Pat. Nos. 3,663,762; 3,764,915; 3,819,872; 3,906,166; and 4,268,722. These system controllers provide overall system control, mediate handoff between cells, and provide telephone interconnection and interface to the public switch telephone network (PSTN).

Figure 5:
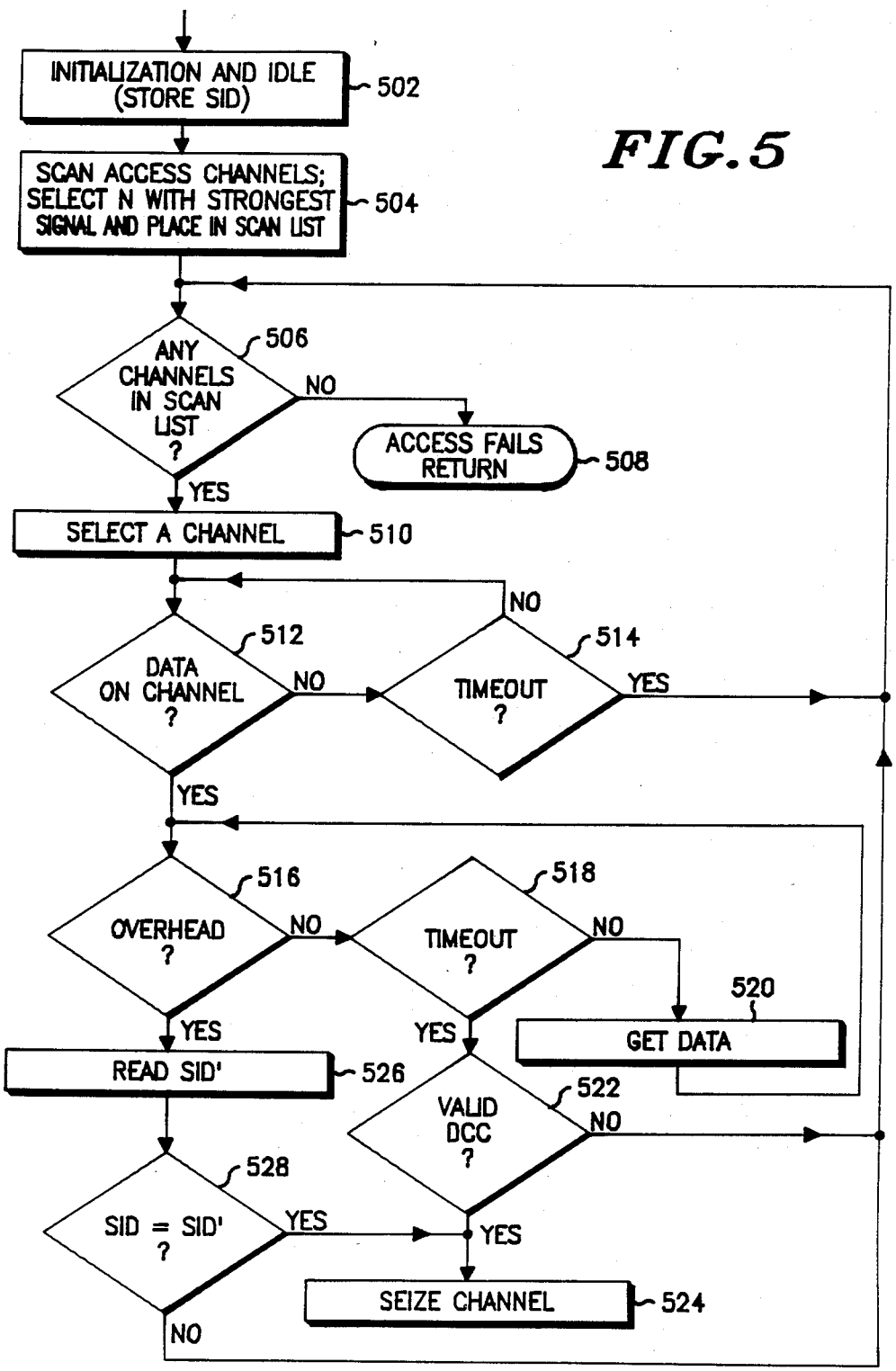
FIG. 5 is a flowchart of the process employed by a subscriber unit in practicing the present invention.

The process by which a subscriber unit 101 avoids the aforementioned problems is shown in the flowchart of FIG. 5. This flowchart diagrams the process utilized by the microprocessor 301 in responding to a requirement to access the radiotelephone system. When the subscriber unit is turned on and is operational, it scans all the control channels which are part of a predetermined list of control channels established at the time the subscriber unit is made operational. Generally, the control channel list consists of all the control channels which are assigned to the domestic wireline operated cellular radiotelephone systems (System B) or all of the control channels which are assigned to the non-wireline cellular radiotelephone systems (System A). Upon selection of the strongest control channel received by the subscriber unit, continues with its initialization process, shown at 502. One task specified as part of the initialization state is that of reading overhead data information transmitted on the selected control channel and detecting the multibit system identification number transmitted as part of the overhead data information. Once detected, this control channel system identification (SID) is stored in the subscriber unit. Such a task is further described in EIA Interim Standard IS-3-D, "Cellular System, Mobile Station-Land Station Compatibility Specification:, March 1987, Section 2.6.1. The subscriber unit then scans a set of paging channels defined in the overhead data information and compares the SID received to the SID stored; a mismatch causes a reinitialization. Upon completion of the initialization task, the subscriber unit enters an idle task also shown at 502. The subscriber unit process remains in the idle state, 502, waiting for a call or ready to make a call by monitoring the paging channel. Such an idle state is further described in EIA Interim Standard IS-3-D, "Cellular System, Mobile Station-Land Station Compatibility Specification", March 1987, Section 2.6.2 Idle. (The subscriber unit may also respond to other system orders such as an audit order or it may register into the radiotelephone system if it has not done so, from this idle state). During the idle state, the subscriber unit receives overhead data, detects the control channel SID from the overhead data, and compares the received SID to the stored SID. In the event of a mismatch, the subscriber unit is forced to return to the initialization state.

When there is a reason for the subscriber unit to access the system, such as when the user attempts to make a call or register in the system, the process causes the subscriber unit to scan its programmed access channels in a sequential scan of the band of channels, select N channels having the strongest signal strength and place the channel number of the selected channels in a scan list (as shown at 504). A brief description of a call control process for a cellular radiotelephone system may be found in: Karin, "A controller For The Mobile Logic Unit in the BTL High Capacity Mobile Telecommunications System", 26th Annual Conference of the IEEE Vehicular Technology Group, March 1976. In the preferred embodiment of the present invention, a determination is made at 506 that all of the channels in the scan list have been sampled for valid data and if no channels having a valid data are found, the access attempt has failed and the subscriber unit is returned to the idle state 502 from 508. Once the scan list has been scanned in its entirety and channels having a maximum signal strength are found, the process selects one of the N strongest channels at 510 and a test is made of the data received from the selected channel at 512. In the preferred embodiment, N=2. If valid data is not found on a channel, the process continues to look for data on the channel for a period of time determined by the time-out function at 514. After a period of time (0.4 second in the preferred embodiment) another channel is selected at 510. If valid data is found on the channel, a test is made, at 516, of whether the data on the selected channel contains a proper overhead message such as that specified in the aforementioned EIA Interim Standard IS-3-D at Section 3.7.1.2. If a valid overhead message is not received, a delay is introduced by a time-out function, at 518, which enables the subscriber unit to attempt to receive additional data on the selected channel, at 520 and retest for a valid overhead message. If a time-out is encountered without a valid overhead message, the subscriber unit conventionally defaults to a test of whether a valid digital color code (DCC) is present on the selected channel at 522 and is described in aforementioned EIA Interim Standard IS-3-D Section 2.6.3.3. If a valid digital color code is not found, another access channel is selected via 506 and 510 and if a valid digital color code is found at 522, conventional channel seizure activity is initiated at 524. Channel seizure activity is further defined in EIA Interim Standard IS-3-D at Section 2.6.3.5.

It is an important feature of the present invention that the detection of valid overhead information at 516 results in a comparison of the system ID (SID) stored as part of the initialization and idle process 502 to the system identification (SID') read from the overhead message of the access channel at 526. The conventional process as specified in EIA Interim Standard IS-3-D Paragraph 2.6.3.4. only causes the overhead message train to be read and certain parameters for the subscriber unit to be extracted; i.e., number of seizure tries allowed and/or number of busy occurrences allowed. In the present invention, the SID read from the control channel (or paging channel) during the initialization and idle state is compared to the SID' read from the overhead message on the access channel and if a match occurs channel seizure activity at 524 is allowed to proceed. If a match is not found at 528 another access channel is selected via 506 and 510. This unique process solves the aforementioned problem by assuring that the subscriber unit will access in the same system in which it initialized and obtained service. The existing cellular radiotelephone system specifications do not require the mobile/portable subscriber units to use the system ID available to them on the access channel while accessing the system. This resulted in call placements into wrong systems due to overlapping coverage areas and/or adjacent channel interference.

Figure 6:
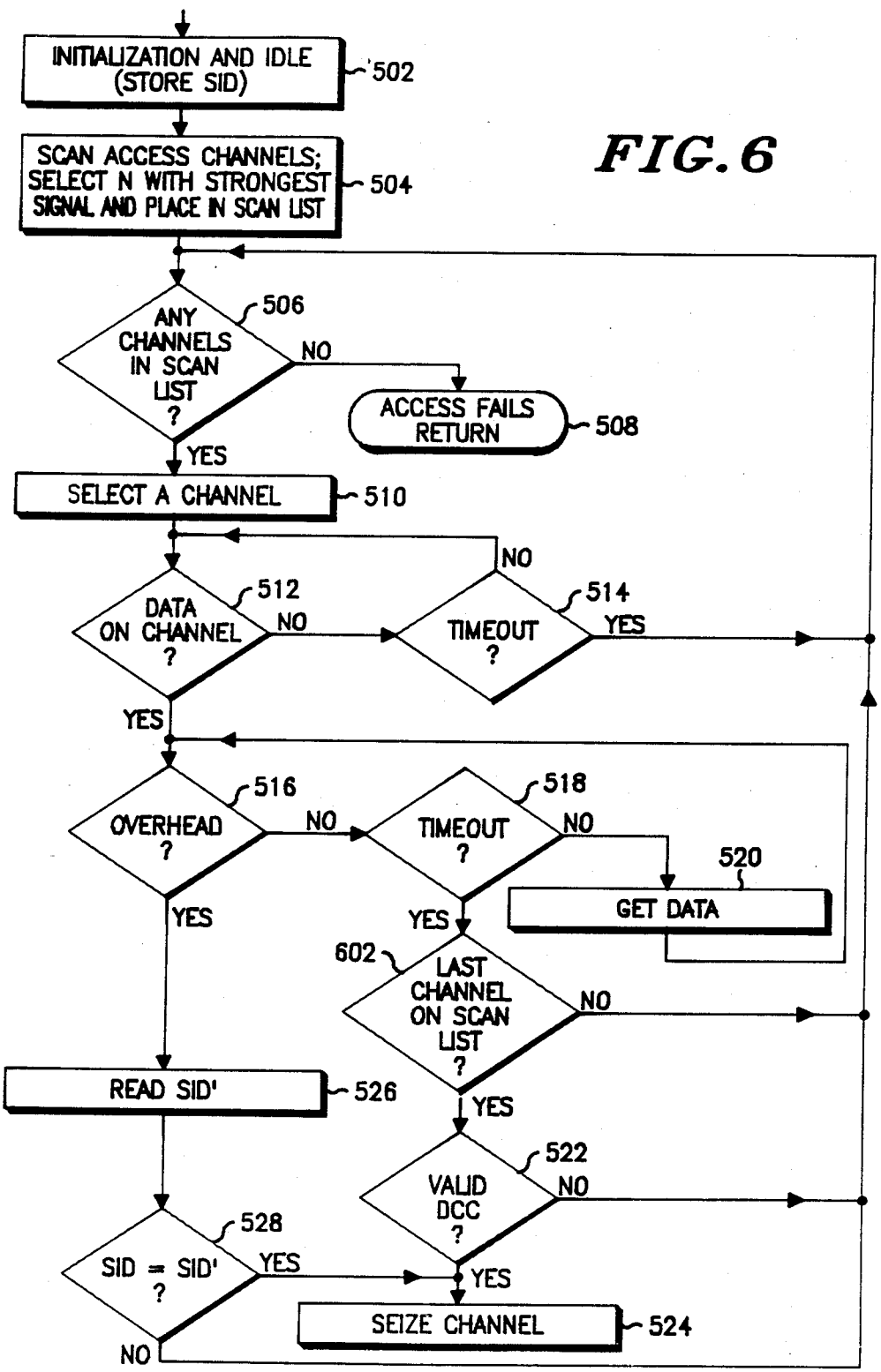
FIG. 6 is a flowchart of the process employed by a subscriber unit in practicing an alternative of the present invention.

An alternative embodiment of the present invention may utilize the process shown in FIG. 6. In this alternative, a time-out of the test for a proper overhead message on the access channel (as made at steps 516, 518 and 520) results in a test of whether the access channel being tested for a valid overhead message is the last channel in the access channel scan list (as tested at 602). If it is not the last access channel on the scan list, another access channel is selected via 506 and 510. If it is the last access channel, test 602 leads to the test of a valid DCC, at 522, as described for FIG. 5. The aforementioned additional step in the process results in improved mobile/portable subscriber unit performance in finding its system. It is anticipated that this improvement could be enhanced even further by increasing N (the number of channels in the scan list) thereby allowing the unit to look at N channels to find the system onto which it was first locked.

In summary then, the problem of a subscriber unit tuning to an access channel which is not associated with the desired radiotelephone system is prevented by causing the subscriber unit to read the system identification from the access channel and to compare the access channel system identification to the system identification read from the control channel during the initialization and idle processes. If a system identification match is found, the radiotelephone system access may proceed. If a system identification match is not found, the subscriber unit tries to access the denied radiotelephone system on another access channel. While a particular embodiment of the invention has been shown and described, it is to be understood that the invention is not to be taken as limited to the specific embodiment herein and that changes and modifications may be made without departing from the true spirit of the invention. It is therefore contemplated to cover the present invention, and any and all such changes and modifications, by the appended claims.

We claim:

1. A radiotelephone subscriber unit having the capacity for operating into more than one radiotelephone system, each radiotelephone system having a plurality of radio coverage areas with at least one control channel and at least one access channel each associated with one radiotelephone system and located in each of the plurality of radio coverage areas, each control channel transmitting a system identification unique to its associated radiotelephone system, the subscriber unit comprising:

means for selecting one control channel, detecting the transmitted control channel system identification, and storing said control channel system identification;

means, responsive to said means for selecting, detecting, and storing, for selecting one of the access channels;

means for detecting an overhead data message transmitted on said selected one access channel;

means for reading an access channel system identification from said detected overhead data message;

means for comparing said access channel system identification with said stored control channel system identification; and means for seizing a channel if said comparisons of said access channel system identification and said control channel system identification substantially yields a latch.

2. A radiotelephone subscriber unit in accordance with claim 1 further comprising means for determining if said overhead data message is detected within a predetermined period of time.

3. A radiotelephone subscriber unit in accordance with claim 2 further comprising means, responsive to said means for determining if said overhead data message is detected within a predetermined period of time, for detecting a predetermined digital color code and for enabling said means for seizing a channel if said predetermined digital color code is detected.

4. A radiotelephone subscriber unit in accordance with claim 2 further comprising means, responsive to said means for determining if said overhead data message is detected within a predetermined period of time, for determining if any other access channels can be selected and for allowing said means for seizing a channel to be enabled if no other access channel can be selected.

5. A method of system access for a radiotelephone subscriber unit having he capacity for operating into more than one radiotelephone system, each radiotelephone system having a plurality of radio coverage areas with at least one control channel and at least one access channel each associated with one radiotelephone system and located in each of the plurality of radio coverage areas, each control channel transmitting a system identification unique to its associated radiotelephone system, the subscriber unit comprising the steps of:

selecting one control channel, detecting the transmitted control channel system identification, and storing said control channel system identification;

selecting, in response to said selecting, detecting, and storing steps, one of the access channels;

detecting an overhead data message transmitted on said selected one access channel;

reading an access channel system identification from said detected overhead data message;

comparing said access channel system identification with said stored control channel system identification; and seizing a channel if said comparison of said access channel system identification and said control channel system identification substantially yields a match.

6. A method in accordance with the method of claim 5 further comprising the step of determining if said overhead data message is detected within a predetermined period of time.

7. A method in accordance with the method of claim 6 further comprising the steps of detecting a predetermined digital color code and enabling said means for seizing a channel if said predetermined digital color code is detected, in response to said step of determining if said overhead data message is detected within a predetermined period of time.

8. A method in accordance with the method of claim 6 further comprising the steps of determining if any other access channels can be selected and allowing said step of seizing a channel to be enabled if no other access channel can be selected, in response to said step of determining if said overhead data message is detected within a predetermined period of time.

9. A method of radio system access for a subscriber radio unit which selects a control channel associated with the radio system, detects a first system identification unique to the radio system and transmitted via the control channel, and stores the first system identification, the method comprising the steps of:

selecting one of a plurality of access channels associated with the radio system after the first system identification is stored;

detecting a second system identification transmitted via said selected access channel;

comparing said second system identification to said first system identification; and enabling access to a channel by which a message may be transmitted from the subscriber radio unit if said second system identification and the first system identification are substantially the same.

10. A method in accordance with the method of claim 9 further comprising the step of determining if said second system identification is detected within a predetermined period of time.

11. A method in accordance with the method of claim 10 further comprising the steps if detecting a predetermined digital color code.

12. A subscriber radio unit for a multichannel radiotelephone system in which the subscriber radio unit selects a control channel associated with a radio system, detects a first system identification unique to the radio system and transmitted via the control channel, and stores the first system identification, the subscriber radio unit comprising:

means for selecting one of a plurality of access channels associated with the radio system after a first system identification is stored;

means for detecting a second system identification transmitted via said selected access channel;

means for comparing said second system identification to said first system identification; and means, responsive to said means for comparing, for enabling access to a channel by which a message may be transmitted from the subscriber radio unit if said second system identification and the first system identification are substantially the same.

13. A subscriber radio unit in accordance with claim 12 further comprising means for determining if said second system identification is detected within a predetermined period of time.

14. A subscriber radio unit in accordance with claim 13 further comprising means for detecting a predetermined digital color code.

* * * * *

UNITED STATES PATENT AND TRADEMARK OFFICE
CERTIFICATE OF CORRECTION

PATENT NO. : 4,905,301

DATED : Feb. 27, 1990

INVENTOR(S) : Robert K. Krolopp, Thomas J. Auchter, Jeffery L. Mullins

It is certified that error appears in the above-identified patent and that said Letters Patent is hereby corrected as shown below:

Col. 7, line 52, "latch" should be --match--.

Col. 8, line 5, "he" should be --the--.

Signed and Sealed this

Twentieth Day of August, 1991

Attest:

HARRY F. MANBECK, JR.

Attesting Officer

Commissioner of Patents and Trademarks